UNITED STATES PATENT OFFICE.

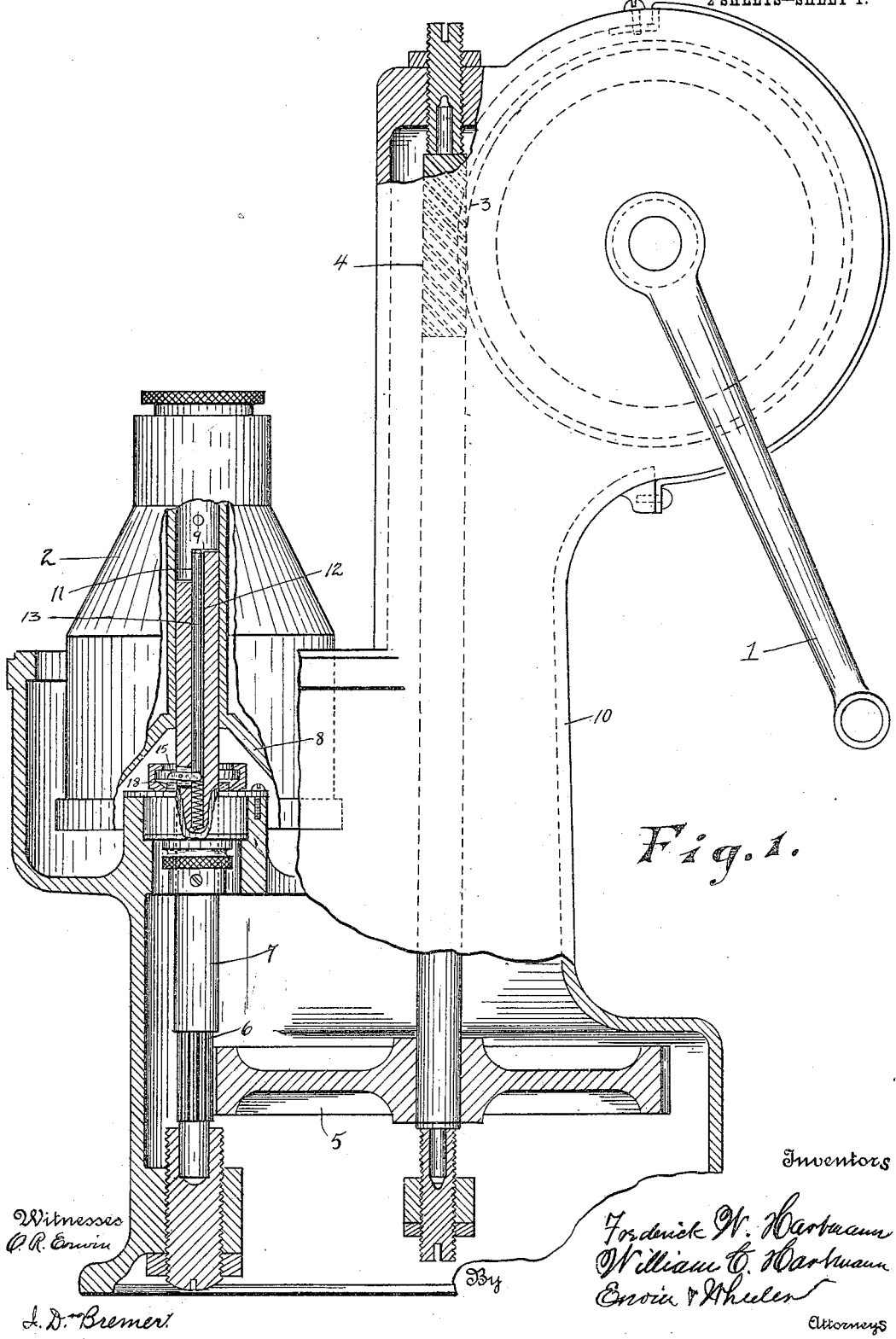

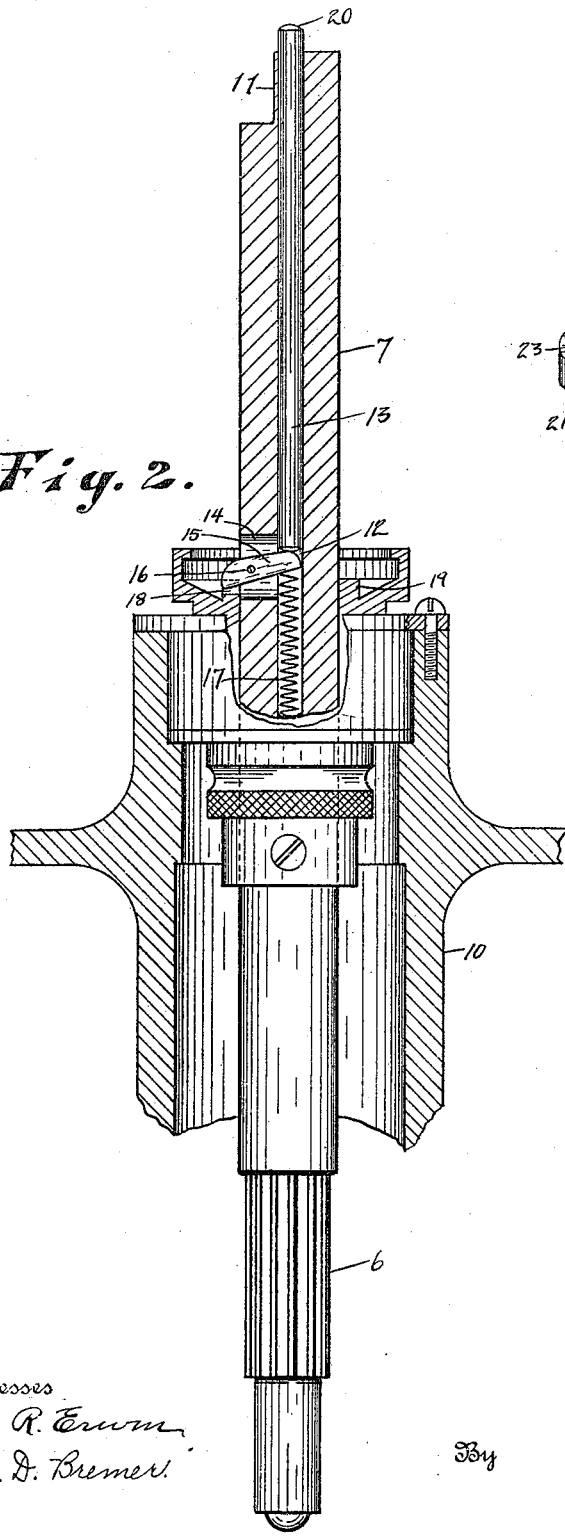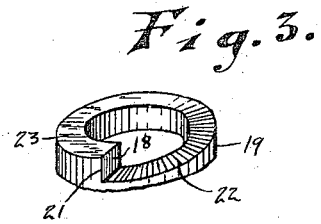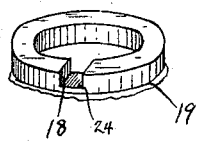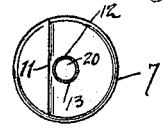

FREDERICK W. HARTMANN AND WILLIAM C. HARTMANN, OF MILWAUKEE, WISCONSIN, ASSIGNORS, BY DIRECT AND MESNE ASSIGNMENTS, TO THE MILWAUKEE SEPARATOR COMPANY, A CORPORATION OF WISCONSIN.

CREAM-SEPARATOR.

962,141.      Specification of Letters Patent.      Patented June 21, 1910.

Application filed November 11, 1909. Serial No. 527,445.

*To all whom it may concern:*

Be it known that we, FREDERICK W. HARTMANN and WILLIAM C. HARTMANN, citizens of the United States, residing at Milwaukee, county of Milwaukee, and State of Wisconsin, have invented new and useful Improvements in Cream-Separators, of which the following is a specification.

Our invention relates to improvements in cream separators and it pertains more especially, among other things, to the device for automatically locking the bowl supporting spindle as soon as the separating bowl is removed therefrom.

The object of our invention is to prevent the injurious effects of the machine being operated or tampered with when the separating bowl has been removed.

It is a well known fact that the proper action of a cream separator necessitates a rapid movement of the bowl. For example, the separating bowl of applicant's device is geared to perform 128 revolutions with each revolution of the driving crank. In other words, it is so geared as to revolve between seven and eight thousand revolutions per minute, and as a consequence the mechanism for attaining this comparatively high speed is necessarily delicate and is injuriously effected by being accidentally or otherwise operated when the bowl is removed, and since it becomes necessary to frequently remove the bowl and the separating cones for the purpose of cleansing, the importance of locking the bowl supporting spindle when the bowl has been removed, will be apparent.

Our invention is explained by reference to the accompanying drawings, in which—

Figure 1 represents a side view thereof, part broken away, to disclose the interior. Fig. 2 is a side view, part in section, of the bowl supporting spindle, showing the mechanism for locking the spindle when the bowl is removed. Figs. 3 and 4 are details in perspective of one of the locking members, and Fig. 5 is a top view of the bowl supporting spindle.

Like parts are identified by the same reference numerals throughout the several views.

1 represents the driving crank of the separator.

2 is a separating bowl.

The mechanism for communicating motion from the crank 1 to the bowl 2, comprising the worm gear 3, worm shaft 4, gear wheel 5, pinion 6, bowl supporting spindle 7, cones 8 and the main supporting frame of the machine 10, are, so far as the purposes of the present application are concerned, substantially of ordinary construction, and invention in this application is predicated more especially upon the mechanism for automatically locking the bowl supporting spindles 7, as soon as the bowl 2 is removed therefrom.

The bowl 2 is provided at its upper end with an angular recess 9 formed for the reception of the angular bearing 11 of the spindle, whereby as the spindle 7 is revolved, motion will be communicated to the bowl. The spindle 7 is provided with a longitudinal central aperture 12 for the reception of the central trip rod 13 and the transverse aperture 14 for the reception of the latch 15, which latch is pivotally supported from the side of the recess 14 by the pivotal bolt 16.

17 is a spiral spring which is supported from the lower end of the aperture 12 beneath the inner end of the latch 15. The tension of the spring is such as to raise the inner end of the latch 15 and the trip rod 13, which is slidably supported therefrom in said recess 12. The length of the central rod 13 is such that when thrown upwardly by the recoil of the spring, it projects at its upper end slightly above the bowl supporting spindle, while the outer end of the latch 15 is simultaneously thrown downward, so as to engage against the stop 18 of the stationary collar 19, whereby the spindle 7 and the operating mechanism connected therewith are locked and prevented from being turned. When, however, the separating bowl 2 is placed on the upper end of the spindle 7, the upper bearing of the recess 9 is brought into contact with the protruding end 20 of the trip rod, whereby the trip rod 13 is forced downwardly, the spring is compressed, and the outer end of the latch 15 is thrown upward and out of contact with the stop 18, when the bowl supporting spindle 7 and the mechanism connected therewith are free to be revolved. It will be understood, however, that as soon as the bowl is removed, the inner end of the latch 15 together with the trip rod 13, will be thrown upwardly by the recoil of said spring 17, when the outer end of said latch 15 will again engage the stop 18, thereby locking the spindle 7 as before.

Figs. 3 and 4 represent perspective views of two forms of stationary collars. In the form shown in Fig. 3, the stop 18 is formed by a vertical cut 21, and the upwardly inclined circular cut 22, whereby the latch may pass gradually down from the upper surface 23 of the collar to the lower end of the vertical cut, as it is brought into contact with the stop 18. In the form shown in Fig. 4, however, the collar is provided with a vertical recess 24 into which the latch 15 is free to drop vertically as it passes over the same, whereby it is brought into contact with said stop 18.

It will be understood that the tension of the spiral spring 17 is such as to yield under the weight of the separating bowl when supported from the spindle, thereby disengaging the latch, while said spring will recoil and throw the latch into its locking position as soon as such bowl is removed.

Having thus described our invention, what we claim as new, and desire to secure by Letters Patent is—

1. In a cream separator of the class described, the combination with the bowl supporting spindle, of a latch carried by said spindle, a stationary stop located near the periphery of said spindle, means adapted to be actuated by the weight of the separating bowl when supported from said spindle for normally retaining said latch out of engagement with said stop, and means carried by said spindle for throwing said latch into engagement with said stop when relieved from the weight of said separating bowl.

2. In a cream separator of the class described, the combination of a bowl supporting spindle provided with a longitudinal central aperture and a horizontal side aperture, a trip rod slidably supported in said central aperture, a latch pivotally supported in said side aperture in connection with said trip rod, a stationary stop located in close proximity to the periphery of said spindle, means for yieldingly supporting said trip rod and the inner end of said latch in their raised position, whereby when relieved from the weight of said bowl, said latch will be brought into contact with said stop and the bowl supporting spindle thereby locked, and whereby when said bowl is in position on said spindle, said latch will be disengaged from said stop, all substantially as and for the purpose specified.

In testimony whereof we affix our signatures in the presence of two witnesses.

FREDERICK W. HARTMANN.
WILLIAM C. HARTMANN.

Witnesses:
JAS. B. ERWIN,
O. R. ERWIN.